(12) United States Patent
McCallister et al.

(10) Patent No.: US 10,270,637 B2
(45) Date of Patent: Apr. 23, 2019

(54) COMMUNICATION SYSTEM WITH PAPR MANAGEMENT USING NOISE-BEARING SUBCARRIERS

(71) Applicant: CrestCom, Inc., Scottsdale, AZ (US)

(72) Inventors: Ronald Duane McCallister, Scottsdale, AZ (US); Eric M. Brombaugh, Mesa, AZ (US)

(73) Assignee: Crestcom, Inc., Scottsdale, AZ (US)

( * ) Notice: Subject to any disclaimer, the term of this patent is extended or adjusted under 35 U.S.C. 154(b) by 0 days.

(21) Appl. No.: 15/851,308

(22) Filed: Dec. 21, 2017

(65) Prior Publication Data

US 2018/0115449 A1    Apr. 26, 2018

Related U.S. Application Data

(63) Continuation of application No. 14/156,621, filed on Jan. 16, 2014, now Pat. No. 9,882,756.

(51) Int. Cl.
*H04L 27/26* (2006.01)

(52) U.S. Cl.
CPC .................. *H04L 27/2623* (2013.01)

(58) Field of Classification Search
CPC ............. H04L 5/0007; H04L 27/2614; H04L 27/2623; H04B 1/0475
See application file for complete search history.

(56) References Cited

U.S. PATENT DOCUMENTS

| 6,424,681 | B1 | 7/2002 | Tellado et al. |
| 6,771,940 | B2 | 8/2004 | Smith |
| 7,295,816 | B2 | 11/2007 | McCallister |
| 7,532,678 | B2 | 5/2009 | Henkel et al. |
| 7,643,801 | B2 | 1/2010 | Piirainen |

(Continued)

OTHER PUBLICATIONS

Ian F. Akyildiz et al., "The evolution to 4G cellular systems: LTE-Advanced", Physical Communication, 2010, pp. 217-244, Georgia Institute of Technology, Atlanta, GA.

(Continued)

*Primary Examiner* — Sung Ahn
(74) *Attorney, Agent, or Firm* — Schmeiser, Olsen & Watts LLP (57) ABSTRACT

A communication system (20) includes a base station (22) and a number of peak-managed user equipment apparatuses (26) that simultaneously transmit peak-reduced FDMA communication signals (128) to the base station (22). The communication system (20) exclusively assigns payload subcarriers (44) to the apparatuses (26) and assigns a few noise-bearing subcarriers (48) for common simultaneous use by all apparatuses (26). Each user equipment apparatus (26) includes a peak reduction section (92) that distorts an otherwise undistorted modulated communication signal (86) into a distorted, peak-reduced communication signal (128) by generating and adding peak-reduction noise (131) to the undistorted signal (86). The peak-reduction noise (131) is primarily mapped onto the noise-bearing subcarriers (48) without conforming to an in-band noise constraint and may be mapped onto the assigned payload subcarriers (44) to the extent permitted by an in-band noise constraint. The peak-reduction noise (131) is blocked in unassigned payload subcarriers (46).

15 Claims, 6 Drawing Sheets

(56) References Cited

U.S. PATENT DOCUMENTS

| | | | |
|---|---|---|---|
| 7,783,260 | B2 | 8/2010 | McCallister et al. |
| 7,792,200 | B2 | 9/2010 | Molander |
| 7,944,991 | B2 | 5/2011 | Zhoa et al. |
| 8,185,065 | B2 | 5/2012 | McCallister et al. |
| 8,331,466 | B2 | 12/2012 | Guo et al. |
| 3,406,113 | A1 | 3/2013 | Zhoa et al. |
| 8,842,757 | B2 | 9/2014 | Guo et al. |
| 8,885,764 | B2 | 11/2014 | Baldemair et al. |
| 9,154,168 | B2 | 10/2015 | Cova |
| 9,331,882 | B2 | 5/2016 | Fehri et al. |
| 9,374,256 | B2 | 6/2016 | Lozhkin |
| 9,503,301 | B2 | 11/2016 | Dick |
| 9,615,326 | B2 | 4/2017 | Kravtsov |
| 9,806,929 | B2 | 10/2017 | Farabegoli et al. |
| 9,848,342 | B1 * | 12/2017 | McCallister ......... H04B 17/336 |
| 9,882,756 | B2 * | 1/2018 | McCallister ........ H04L 27/2623 |
| 9,973,362 | B2 | 5/2018 | Jai et al. |
| 10,050,816 | B2 | 8/2018 | Rajagopal et al. |
| 2008/0019453 | A1 | 1/2008 | Zhao et al. |
| 2008/0219372 | A1 | 9/2008 | Hori et al. |
| 2010/0020895 | A1 | 1/2010 | Jiang et al. |
| 2011/0032973 | A1 | 2/2011 | To et al. |
| 2011/0064162 | A1 | 3/2011 | McCallister et al. |
| 2011/0092173 | A1 | 4/2011 | McCallister et al. |
| 2011/0116383 | A1 | 5/2011 | Lipka |
| 2011/0211646 | A1 | 9/2011 | Mashino et al. |

OTHER PUBLICATIONS

Traian Andrei, "An Overview of Long Term Evolution Advanced", http://www.cse.wustl.edu/~jain/cse574-10/ftp/lte-adv/index.html, May 7, 2010, pp. 1-13.

Burca Hanta, "SC-FDMA and LTE Uplink Physical Layer Design", Seminar Ausgewählte Kapitel der Nachrichtentechnik, WS 2009/2010; Dec. 2, 2009; pp. 1-16.

Hyung G. Myung et al., "Peak Power characteristics of Single Carrier FDMA MIMO Precoding System", IEEE, 2007, pp. 1-5, Brooklyn, NY.

Telesystem Innovations Inc., "LTE in a Nutshell: The Physical Layer", 2010, pp. 1-18, Canada.

Y.C. Wang et al., "Optimized Iterative Clipping and Filtering for PAPR Reduction of OFDM Signals", Communications, IEEE Transactions, Jan. 2011, pp. 33-37, vol. 59, Issue 1, USA.

A.Z. Yonis et al., "Peak-Throughput of LTE-Release 10 for Up/Down Link Physical Layer", International Journal of Information & Network Security (IJINS), Jun. 2012, pp. 88-96, vol. 1, No. 2, Iraq.

Jose Tellado et al.; "PAR Reduction in Multicarrier Transmission Systems"; Information Systems Laboratory; Feb. 9, 1998; pp. 1-14; Stanford University, CA.

Jose Tellado et al.; "Peak Power Reduction for Multicarrier Transmission"; Information Systems Laboratory; 2000; pp. 1-6; Stanford University, CA.

S. Janaaththanan et al.; "A Gradient Based Algorithm for PAPR Reduction of OFDM Using Tone Reservation Technique"; May 26, 2008; pp. 2977-2980; IEEE Xplore; University of Surrey.

Mahmoud Ferdosizadeh Naeiny et al.; "Selective Tone Reservation Method for PAPR Reduction of Spatially Multiplexed OFDM Systems"; 2012; vol. 1, No. 1; pp. 25-36; Journal of Communication Engineering; Iran.

Christian Siegl et al.; "Tone Reservation for Peak-to-Average Power Ratio Reduction in OFDM Under Different Optimization Constraints"; 2008; pp. 1-5; Germany.

Sung-Eun Park et al.; "Tone Reservation Method for PAPR Reduction Scheme"; IEEE 802.16 Broadband Wireless Access Working Group; Oct. 31, 2003; pp. 1-7; Korea.

Emmanuel Manasseh et al.; "Minimization of PAPR in MIMO-OFDM Systems by Tone Reservation Techniques and Pilot Tones"; 2011; pp. 1-4; Dept. of Artificial Complex Systems Engineering, Hiroshima University; Japan.

Malhar Chauhan et al.; "PAPR Reduction in OFDM System Using Tone Reservation Technique"; International Journal of Computer Technology and Electronics Engineering (IJCTEE); vol. 2, Issue 4, Aug. 2012; pp. 57-60; India.

Saeed Gazor et al.; "Tone Reservation for OFDM Systems by Maximizing Signal-to-Distortion Ratio"; Wireless Communications, IEEE Transactions on; vol. 11, Issue 2; Feb. 2012; pp. 762-770; Canada.

Carole A. Devlin et al.; "Gaussian Pulse Based Tone Reservation for Reducing PAPR of OFDM Signals"; IEEE; 2007; pp. 3096-3100; University College Dublin, Ireland.

Kangwoo Park et al.; "Low-Complexity Tone Reservation Method for PAPR Reduction of OFDM Systems"; IEEE; 2010; pp. 2147-2150; Dept. of Electronic Engineering (KAIS); Korea.

Tao Jiang et al.; "An Overview: Peak-to-Average Power Ratio Reduction Techniques for OFDM Signals"; IEEE Transactions on Broadcasting; vol. 54, No. 2, Jun. 2008; pp. 257-268; National Chung Cheng University; China.

* cited by examiner

COMMUNICATION SYSTEM WITH PAPR MANAGEMENT USING NOISE-BEARING SUBCARRIERS

This application is a continuation of U.S. patent application Ser. No. 14/156,621 filed on Jan. 16, 2014, which is hereby incorporated by reference in its entirety and this application claims priority under at least 35 U.S.C. 120 and/or any other applicable provision in Title 35 of the United States Code.

TECHNICAL FIELD OF THE INVENTION

The present invention relates generally to the field of communication systems. Specifically, the present invention relates to systems, circuits, and/or processes configured to reduce peak-to-average power ratio (PAPR) in communication signals prior to amplification.

BACKGROUND OF THE INVENTION

A peak of a communication signal represents the greatest instantaneous amplitude, magnitude, or power level exhibited by the communication signal within some period of time. The average of a communication signal represents the average amplitude, magnitude, or power level of the communication signal over that same period. The peak is greater than the average, and the ratio of the peak power to the average power (PAPR) is a parameter of interest to communication system designers.

A communication system should achieve certain goals, such as providing for communication over a certain minimum distance, providing a certain minimum data rate, accommodating a certain minimum number of users, achieving a certain minimum quality or robustness in the communicated data, consuming less than a certain maximum amount of power, and the like.

As PAPR increases, meeting these goals for the communication system's transmitting units becomes increasingly difficult. A transmitting unit's power amplifier is desirably as linear as possible, but linearity is achieved only so long as the amplitude of a communication signal remains beneath some maximum level. If the communication signal's instantaneous power exceeds this maximum level, non-linear amplification results, causing the spectrum of the communication signal to grow and exceed regulatory limitations imposed on the transmitting unit. Accordingly, the communication signal's instantaneous power should be kept below this maximum level. If a transmitting unit in this communication system is configured to accommodate its goals with a communication signal exhibiting a certain average power level, then economic and power efficiency constraints may proscribe the use of an RF power amplifier that can also accommodate an instantaneous power level significantly greater (e.g., >7 dB) than this average power level.

Different communication signal waveforms exhibit different PAPR characteristics. For example, waveforms configured in accordance with orthogonal frequency-division multiplexing (OFDM) techniques or code division multiplexing (CDM) techniques, tend to exhibit rarely occurring peaks of high power (e.g., >9 dB) relative to the average power. Little signal energy is contained in the rarely occurring high power peaks due to their scarcity. Consequently, any of a variety of conventional peak-reduction, crest-reduction, or PAPR-reduction techniques known to those skilled in the art may be employed to reduce the peaks prior to amplification. Coupled with such techniques, the amplitude of the communication signal waveform is then scaled to the point where the peak-reduced waveform's peak matches the maximum peak that the power amplifier can linearly amplify. In other words, the average power is increased by the amount of the PAPR reduction to improve the ability of the communication system to accomplish its goals.

While a variety of different conventional peak-reduction techniques are known, all intentionally distort what would otherwise be an undistorted communication signal to produce a distorted, peak-reduced communication signal for amplification in an RF power amplifier. The distortion added by a peak-reduction technique amounts to noise for the purposes of successfully communicating information between a transmitter and receiver. This peak-reduction noise may appear in the assigned frequency spectrum for the transmission unit and/or outside of this frequency spectrum. The different peak-reduction techniques are judged in accordance with their effectiveness in reducing PAPR while accommodating important constraints. These constraints include maintaining transmission unit compliance with a spectral mask which addresses out-of-band emissions and is imposed by governmental regulations, and compliance with an in-band noise constraint. The in-band noise constraint may be specified by a communication standard to which the communication system adheres or otherwise configured to indicate a noise level in the transmitted signal above which successful reception of communicated data is likely to suffer. The better peak-reduction techniques achieve greater amounts of PAPR reduction while respecting these noise constraints.

For communication signal waveforms configured in accordance with OFDM and CDM modulation techniques, including extending these modulation techniques to apply to multi-user channel access methods, such as orthogonal frequency-division multiple access (OFDMA) and code division multiple access (CDMA), significant PAPR reductions may be achieved while distorting the communication signal only a little bit. But PAPR reduction has a nonlinear relationship with respect to the amount of peak-reduction noise introduced into the communication signal. Each additional tenth of a decibel (dB) reduction in PAPR is achieved by distorting the communication signal marginally more than was required to achieve the last tenth of a dB reduction in PAPR. Where a final step in PAPR reduction process occurs to cause PAPR to reach its minimum achievable value, the final step has introduced a large amount of peak-reduction noise into the communication signal to achieve only a small amount of PAPR reduction. To achieve large reductions in PAPR, large amounts of peak-reduction noise are generated, and this peak-reduction noise should not cause the waveform to violate in-band or out-of-band constraints.

Single carrier frequency division multiple access (SC-FDMA) has become a widely used communication signal waveform, and is currently specified for Long Term Evolution (LTE) compliant communication systems. SC-FDMA may be considered to be an extension of OFDMA, where the extension consists primarily in the inclusion of a time-to-frequency domain transformation of the payload data in the transmitting unit, coupled with a complementary frequency-to-time domain transformation in the receiving unit. Compared to OFDMA waveforms, this additional transformation tends to spread the waveform's energy more evenly over time so that it exhibits a lower PAPR for amplification. In fact this reduction in PAPR compared to OFDMA or CDMA waveforms is often noted as being the primary reason SC-FDMA has become widely used in recent years. While SC-FDMA, without PAPR reduction, does not appear to achieve as low of a PAPR as can be achieved with OFDMA when paired with one of the better PAPR reduction techniques, it nevertheless gets close enough that the inclusion of PAPR reduction circuits has usually been deemed not worth the cost.

Unfortunately, communication systems are beginning to adhere to newer communication standards that have the effect of changing the character of SC-FDMA waveforms that complied with older standards. As communication systems push from LTE Rev 008 to Rev 009 and beyond (i.e., LTE-A), the compliant communication signal waveform will exhibit an increased PAPR from that observed in LTE Rev 008. This increased PAPR is attributable at least in part to one or more of an expanded bandwidth, aggregated inter-band and intra-band component carriers, and expanded multiple-input and multiple-output (MIMO) transmission modes. Accordingly, such newer-version SC-FDMA waveforms will fail to exhibit the acceptably low PAPRs that are compatible with power-efficient and economically beneficial RF power amplifiers, such as those exhibited by older-version SC-FDMA waveforms.

What is needed is an improvement in communication signal peak management that will be applicable to a variety of FDMA and other waveforms, including more modern, expanded-bandwidth SC-FDMA waveforms, and that will conform with out-of-band and in-band noise constraints, yet permit the introduction of increased levels of distortion in the undistorted waveform so that communication signal PAPR may be reduced to the low level that is compatible with power-efficient and economically beneficial RF power amplifiers.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
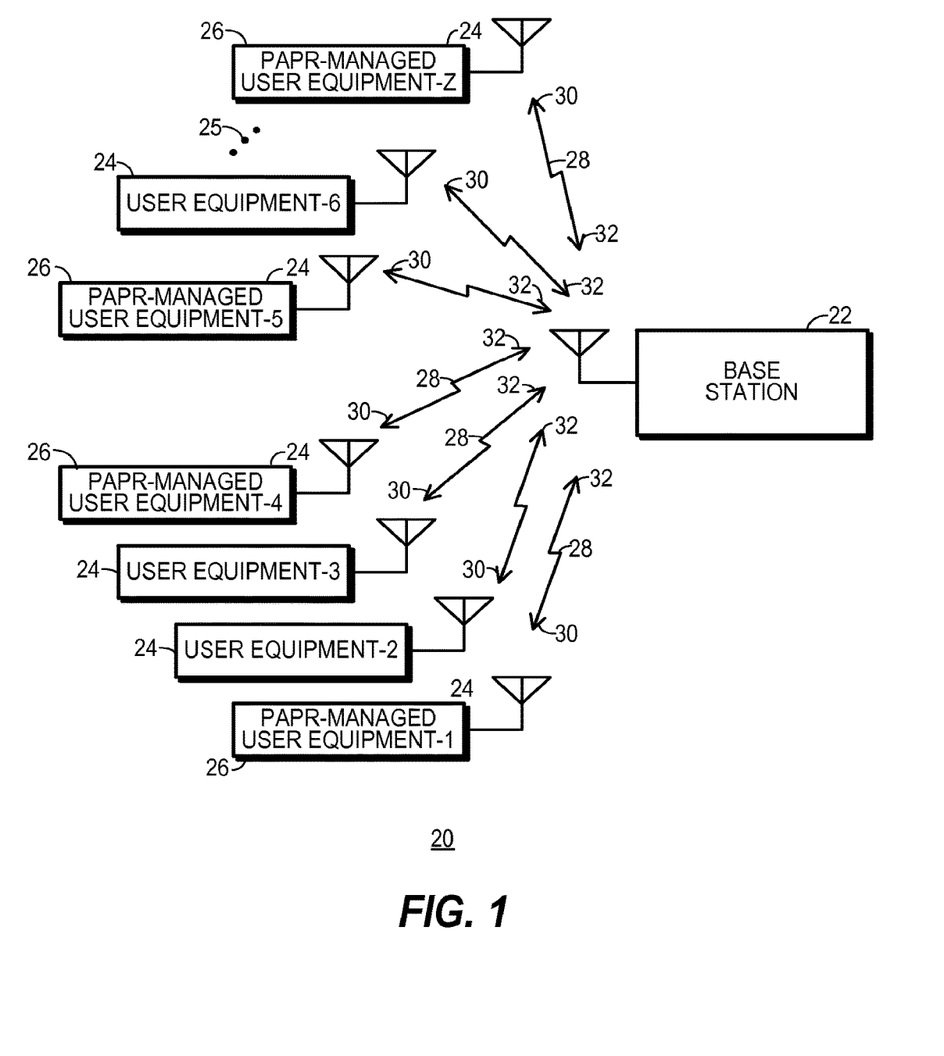
FIG. 1 shows a block diagram of one embodiment of an FDMA communication system in which the present invention may be practiced.
Figure 2:
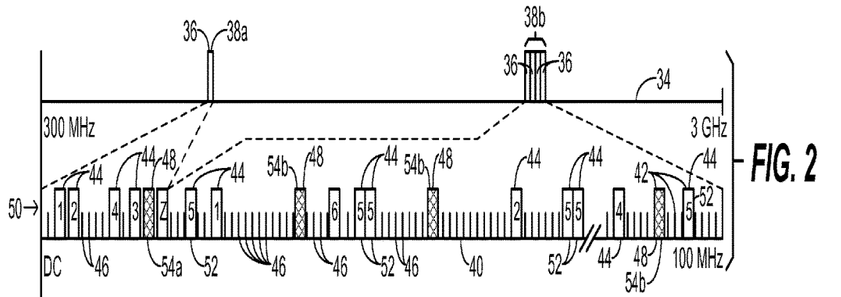
FIG. 2 shows an exemplary schematic frequency domain plot of the frequency spectrum used in one embodiment of the FDMA communication system depicted in FIG. 1.

FIG. 1 shows a block diagram of an FDMA communication system 20. FIG. 2 shows an exemplary schematic frequency domain plot of the frequency spectrum used in one embodiment of FDMA communication system 20.

Referring to FIGS. 1-2, communication system 20 may include a base station 22 with which any number of user equipment apparatuses (hereinafter referred to as "UEs") 24 may communicate. Ellipsis 25 shown in FIG. 1 and other figures discussed below indicate that one or more items are being omitted from the figure but can be inferred from the context. Communication system 20 engages in wireless, radio-frequency (RF) communications between UEs 24 and base station 22, but the present invention is not limited to wireless or to RF communication. FIG. 1 distinguishes UEs 24 from one another through the use of suffixed characters 1-6, and "Z". At least a portion of UEs 24, for example UEs 1, 4, 5, and Z, may be configured as PAPR-managed UEs 26. PAPR-managed UEs 26 include transmitters which include circuits, systems, and/or processes configured to reduce the peak-to average power ratio (PAPR) of their communication signals prior to final amplification.

Communication system 20 may concurrently support any number of concurrently active communication links 28, with each link 28 extending between a UE 24 and base station 22. Each communication link 28 may include a down link (DL) 30, supported by a transmitter at base station 22 and a receiver at the UE 24, and an up link (UL) 32, supported by a transmitter at the UE 24 and a receiver at base station 22. Multiple ones of UEs 24 may broadcast over their ULs 32 simultaneously. Interference between the different ULs 32 is avoided at least in part through the use of a frequency-division multiple access (FDMA) multi-user channel access method where different UEs 24 are assigned different portions of an electromagnetic spectrum 34 (FIG. 2) at any given instant for use in transmitting over their ULs 32. Spectrum 34 represents that portion of the electromagnetic spectrum provided for all ULs 32 that terminate at base station 22. In one embodiment, DLs 30 occupy different portions of the electromagnetic spectrum than spectrum 34.

In another embodiment, DLs 30 occupy spectrum 34 at different times than when spectrum 34 is being used to support ULs 32.

In particular, for ULs 32 communication system 20 may implement either an orthogonal frequency-division multiple access (OFDMA) channel access method, as specified for UL use in accordance with WiMAX standards (e.g., 802.16), a single-carrier frequency-division multiple access (SC-FDMA) channel access method as specified for UL use in accordance with Long Term Evolution (LTE) standards, or other FDMA multi-user channel access methods known to those skilled in the art. The following discussion will be primarily directed to ULs 32 which are substantially compatible with such FDMA communication standards due to their multiple access characteristic in which many UE's 24 may simultaneously transmit to a single base station 22.

FIG. 2 depicts spectrum 34 in a manner consistent with LTE-Advanced (LTE-A) communication standard. A number of component carriers (CCs) 36 may be spread over a plurality of widely separated, non-contiguous frequency bands 38. FIG. 2 shows two such frequency bands 38a and 38b. Component carriers 36 are aggregated together to form a wide bandwidth 40, which FIG. 2 depicts in a contiguous baseband form as extending between DC and 100 MHz. For purposes of the present invention, the use of distinct component carriers 36, different non-contiguous frequency bands 38, or a 100 MHz bandwidth is not required. But when these or other complexities are present, a modulated communication signal waveform's unaltered PAPR is likely to be deemed undesirably high.

Bandwidth 40 is divided into a large number of subcarriers 42. For OFDMA and SC-FDMA communication systems, each subcarrier 42 has a narrow bandwidth compared to overall bandwidth 40 so that up to thousands of subcarriers 42 may be present in bandwidth 40. Subcarriers 42 may be used for various types of uplink physical channels, including physical uplink shared channels (PUSCH), physical uplink control channels (PUCCH), and physical random access channels (PRACH). FIG. 2 generally refers only to the PUSCH type of channels. PUCCH and PRACH channels are present in system 20, but omitted in FIG. 2 for clarity. Thousands of PUSCH type subcarriers may still be present in bandwidth 40.

Within communication system 20, PUSCH subcarriers 42 are classified as being of three types: assigned payload subcarriers 44, unassigned payload subcarriers 46, and noise-bearing subcarriers 48. Collectively, assigned payload subcarriers 44, unassigned payload subcarriers 46, and noise-bearing subcarriers 48 are referred to as a population 50 of subcarriers 42. It is base station 22 that defines the types and assignments for subcarriers 42. Those definitions, allocations, and/or assignments may then be communicated to the UEs 24 capable of communicating with base station 22 through suitable channels of DLs 30. Such definitions, allocations, and/or assignments may change from time to time when base station 22 determines that such changes are desirable. Moreover, communication system 20 may be included in a larger communication system which includes multiple base stations 22, and different base stations 22 may or may not use different subcarrier definitions, allocations, and/or assignments.

FIG. 2 depicts population 50 of subcarriers 42 from the perspective of base station 22. From the perspective of base station 22, assigned payload subcarriers 44 include those subcarriers 42 that are dedicated to communicating user payload data over any UL 32 from any UE 24 to base station 22. Thus, FIG. 2 shows assigned payload subcarriers 44 as being further classified into exclusive subsets 52 of population 50 of subcarriers 42. Each exclusive subset 52 is exclusive to the particular UE 24 (e.g., 1-6 or Z) to which the exclusive subset 52 is assigned. To avoid interference, assigned payload subcarriers 44 are assigned on a mutually exclusive basis for any given instant in time. In other words, no assigned payload subcarrier 44 in an exclusive subset 52 is assigned to more than one UE 24 at the same time. Within population 50, an exclusive subset 52 may include assigned payload subcarriers 44 located adjacent to one another, dispersed throughout a CC 36, dispersed through a frequency band 38, or dispersed throughout the entirety of bandwidth 40. From the perspective of base station 22, unassigned payload subcarriers 46 are not currently in use in any UE 24 but are available for assignment as either an assigned payload subcarrier 44 or as a noise-bearing subcarrier 46 when needed.

From the perspective of a single UE 24, assigned and unassigned payload subcarriers 44 and 46 have a slightly different scope. For each UE 24, assigned payload subcarriers 44 are only those subcarriers 44 in the exclusive subset 52 that are assigned to that UE 24. Moreover, any payload subcarrier that is not assigned to that same UE 24 is considered to be an unassigned payload subcarrier 46.

For the purposes of the present invention, assigned payload subcarriers 44 are defined to be subcarriers 42 that are intended to convey user payload data in a manner that allows the user payload data to be successfully received, demodulated, and decoded. User payload data are the data that a transmitter of a UE 24 is provided to communicate and may be distinguished from control data, which are communicated for purposes of managing and controlling communication system 20 and any larger network or networks of which communication system 20 may be a part. An ultimate consumer of the communicated user payload data is considered to be outside of communication system 20. User payload data may originate from a user interface portion, including a microphone, camera, keyboard, keypad, mouse, and the like, or from a data file or buffer located in a memory portion of a UE 24. Nothing prevents an assigned payload subcarrier 44 from also carrying some amount of noise, including peak-reduction noise, but such noise is at a sufficiently low level that it does not prevent successful recovery of the user payload data in a receiver. In assigned payload subcarriers 44 transmitted from a UE 24, a majority of the energy amounts to the signal that conveys the user payload data, not noise, giving the assigned payload subcarriers 44 a signal-to-noise ratio (SNR) of greater than one, or greater than 0 dB expressed in decibels.

For purposes of the present invention, noise-bearing subcarriers 48 are defined to differ from assigned payload subcarriers 44 in that they are not intended to convey user payload data. Instead they convey noise from the perspective of successfully communicating user payload data from any UE 24 to base station 22. While the energy in noise-bearing subcarriers 48 may amount to nothing but noise as far as a receiver in base station 22 is concerned, the majority of this energy is specifically crafted within PAPR-managed UEs 26 to reduce communication signal waveform peaks and correspondingly increase average power prior to amplification in the transmitters of UEs 26. This allows the use of more power-efficient and cost-beneficial power amplifiers. And, it allows transmitters in PAPR-managed UEs 26 to better meet communication system goals related to data rates, data throughput, data robustness, radio range, power consumption, and the like. Nothing prevents a transmitter from modulating user payload data or other data into signals applied to noise-bearing subcarriers 48. But the noise level of noise-bearing subcarriers 48 is most likely too great for a successful recovery of such data. In noise-bearing subcarriers 48 transmitted from a PAPR-managed UE 26, a majority of the energy is peak-reduction noise rather than the signal that conveys the user payload data. Consequently, noise-bearing subcarriers 48 transmitted from any UE 26 exhibit a SNR of less than one, or less than 0 dB expressed in decibels.

In the preferred embodiment, only a small fraction of the population 50 of subcarriers 42 is assigned as noise-bearing subcarriers 48 by base station 22. Noise-bearing subcarriers 48 are assigned to noise-bearing subsets 54 of population 50, and different noise-bearing subsets 54 may be formed for non-contiguous frequency bands 38. FIG. 2 shows a noise-bearing subset 54a for frequency band 38a and a noise-bearing subset 54b for frequency band 38b. Noise-bearing subcarriers 48 may be located adjacent to one another in bandwidth 40, or noise-bearing subcarriers 48 may be dispersed throughout bandwidth 40. Moreover, that small fraction of population 50 assigned to be noise-bearing subcarriers 48 in a subset 54 are assigned for common, simultaneous use by any PAPR-managed UE 26 within radio range of the base station 22. Base station 22 is desirably configured to ignore any energy received in noise-bearing subcarriers 48, and is preferably configured to repress the influence such noise-bearing subcarrier energy may have upon the demodulation and detection of data being conveyed in assigned payload subcarriers 44.

Communication system 20 may pay a cost in terms of data throughput due to the assignment of noise-bearing subcarriers 48 from which no user payload data is recovered. But that data throughput cost is only borne when system 20 has all subcarriers 42 assigned, and no unassigned subcarriers 46 are present. In these periods, noise-bearing subcarriers 48 might have otherwise been assigned for use as payload subcarriers 44 and have been useful in conveying user payload data. On the other hand, when unassigned payload subcarriers 46 are present, communication system 20 reaps a substantial benefit from improvements in data rate, data throughput, and/or data robustness achieved by operating PAPR-managed UE's 26 at higher average transmit power levels with no communication-related cost. Moreover, even when no unassigned payload subcarriers 46 are present, these benefits more than offset the minor loss of a few subcarriers 42 to a noise-bearing role.

Further, as bandwidth 40 increases, for example approaching the 100 MHz range, and the number of subcarriers 42 in population 50 increases, the benefits of assigning and using noise-bearing subcarriers 48 as described herein increase. As bandwidth increases for FDMA waveforms, including SC-FDMA and OFDMA waveforms, PAPR increases. For any given power amplifier, as PAPR increases average transmit power decreases to maintain linearity and compliance with spectral mask requirements. The decreased average transmit power would cause a reduced data rate, reduced data throughput, reduced data quality, and/or reduced radio range. But, the assignment of a few noise-bearing subcarriers 48 allows PAPR to be significantly reduced in PAPR-managed UEs 26 and correspondingly allows the reductions in data rate, throughput, quality, and the like to be avoided.

As a non-limiting example, when a 100 MHz bandwidth 40 has 90 MHz of roughly contiguous spectrum available for allocation to communicating user payload data, approximately 89 MHz of the available 90 MHz may be simultaneously used as assigned payload subcarriers 44, with roughly around 1 MHz of the available 90 MHz spectrum being assigned to noise-bearing subcarriers 48. The 89 MHz of allocated subcarriers 44 may be divided among up to 89 PAPR-managed UEs 26, with each UE 26 having sufficient UL 32 capacity to support a video link. All 89 PAPR-managed UEs 26 can reap benefits of significant PAPR reduction, and all 89 PAPR-managed UEs 26 share the 1 MHz of noise-bearing subcarriers 48. A greater than 3 dB reduction in PAPR may be achieved in this circumstance, with a corresponding 3 dB increase in average transmitted power. The UL 32 may be configured using an appropriate multiple-input and multiple-output (MIMO) mode or other technique known to those of skill in the art to use the increase in average transmitted power to increase the data rate and throughput for 98.9% of the available spectrum by 100%, while holding data quality and radio range unchanged. In a peak throughput situation, this 100% increase is offset by only a 1.1% reduction in the number of payload subcarriers. For less than peak throughput situations, the improvement occurs with no reduction in the number of assigned payload subcarriers.

For reduced bandwidths 40, for inter-band CC 36 aggregation situations, and for situations where a significant number of UEs 26 require greater UL 32 capacity than the other UEs 26, the performance improvements may be less than those achieved in the above-discussed non-limiting example. But noise-bearing subcarriers 48 may be combined with assigned payload subcarriers 44 in a wide variety of ways to accommodate different situations while still achieving significant performance benefits. In the preferred embodiments, useful benefits may be achieved when fewer noise-bearing subcarriers 48 are assigned than payload subcarriers 44 (from the perspective of base station 22), and particularly when no more than one noise-bearing subcarrier 48 is provided for each four assigned payload subcarriers 44 from the perspective of base station 22.

Figure 3:
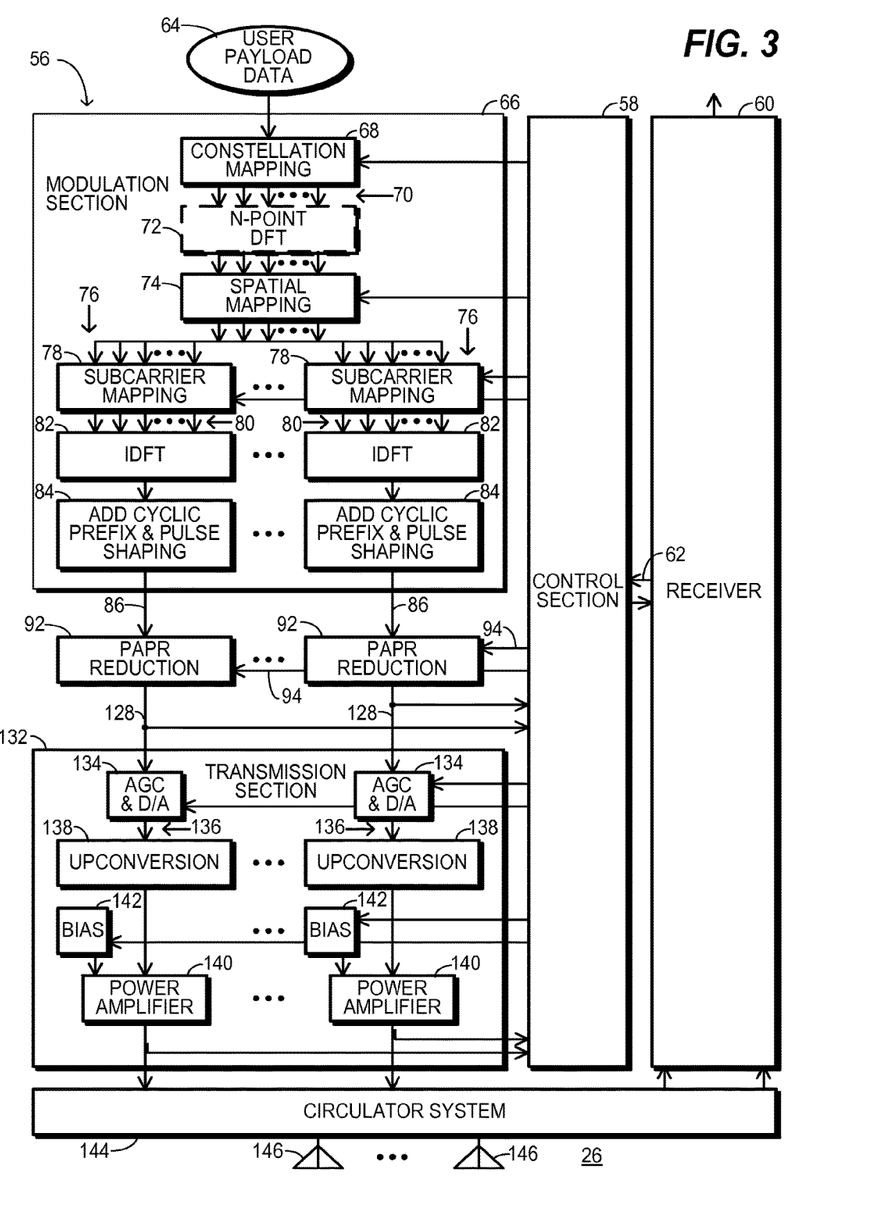
FIG. 3 shows a simplified block diagram of one embodiment of a PAPR-managed user equipment apparatus (UE) which may be used in the FDMA communication system depicted in FIG. 1.

FIG. 3 shows a simplified block diagram of one embodiment of a PAPR-managed UE 26 which may be used in communication system 20 (FIG. 1). UE 26 includes a transmitter 56, a control section 58, and a receiver 60. PAPR management in UE 26 occurs in transmitter 56, under the control of control section 58, which responds to data received from base station 22 (FIG. 1) through receiver 60. Control section 58 may be implemented using conventional digital signal processor (DSP), microcontroller, microprocessor, computer, processor, and/or state machine circuits, including peripheral analog and digital devices, converters, and memory, and processes controlled by software. Receiver 60 may be implemented using a conventional receiver of a type known to those skilled in the art and configured for operation under the communication standards with which the down link 30 (FIG. 1) portions of communication links 28 (FIG. 1) are compatible.

For the purposes of this discussion, in addition to other capabilities, receiver 60 is capable of receiving control data 62 from base station 22, and control section 58 obtains control data 62 from receiver 60. Control data 62 encompass a wide variety of data items. For example, control data 62 identify assigned payload subcarriers 44 for this particular UE 26, unassigned payload subcarriers 46, and noise-bearing subcarriers 48. Such subcarriers 44, 46, and 48 may be identified by suitable index numbers or other identifiers for each subcarrier 44, 46, and 48, by specifying algorithms that control section 58 may perform to identify subcarriers 44, 46, and 48, or in any other manner known to those of skill in the art. Moreover, control data 62 may be obtained either directly or indirectly. For example, control data 62 may specify only those subcarriers 42 included in subsets 52 and 54, then control section 58 may obtain identities of unassigned payload subcarriers 46 by concluding that subcarriers 46 are those subcarriers 42 not included in subsets 52 or 54. The identities of assigned payload subcarriers 44, unassigned payload subcarriers 46, and noise-bearing subcarriers 48 may change from time to time at the discretion of base station 22. And, a frequency hopping scheme may be established by directly changing subcarrier identities from time to time, by implementing an algorithm in control section 58 which specifies the hopping sequence, or in any other manner known to those of skill in the art.

User payload data 64 are supplied from outside transmitter 56 to a modulation section 66 of transmitter 56. User payload data 64 may have been processed or encoded for block and/or convolutional error correction, interleaving, and the like. User payload data 64 are specifically supplied to a constellation mapping section 68, which performs a bit-level modulation operation that maps user payload data 64 into a complex, quadrature phase space, in accordance with a phase constellation, to form modulation symbols 70. Mapping section 68 may also initially perform a serial-to-parallel conversion on the incoming data stream. Control data 62 includes instructions for a modulation order and coding rate to be applied to user data 64, and constellation mapping section 68 selects a phase constellation to use in its mapping operation that responds to this control data.

After constellation mapping section 68, modulation section 66 groups modulation symbols 70 into blocks containing N symbols, and performs a spreading function in a digital Fourier transform (DFT) section 72. The spreading function produces a frequency domain representation of modulation symbols 70. The Fourier transform operation of section 72 may be used in the formation of SC-FDMA waveforms, but may be omitted in order to form OFDMA waveforms.

Following DFT section 72, user payload data, now represented as modulation symbols in the frequency domain, are routed to a spatial mapping section 74. Spatial mapping section 74 performs spatial MIMO processing techniques known to those of skill in the art in accordance with a MIMO mode specified by control data obtained through control section 58. Spatial mapping section 72 may derive a plurality of separate spatial mappings of the frequency domain modulation symbols, where each spatial mapping will be subsequently processed in a separate transmitter channel 76 and transmitted as a separate transmit signal from an antenna spaced apart from the other transmitter channel 76 antennas. While MIMO processing is desirable because it achieves certain communication-related benefits, its inclusion is not a requirement in transmitter 56.

Following spatial mapping section 74, for each transmitter channel 76 a subcarrier mapping section 78 maps the frequency domain modulation symbols into M (where M>N) assigned payload subcarriers 44, as identified by control section 58 and specified by base station 22. Desirably, subcarrier mapping section 78 maps no energy into unassigned payload subcarriers 46 to avoid interference with other UEs 24 simultaneously broadcasting in communication system 20. And, subcarrier mapping section 78 also desirably avoids mapping energy into noise-bearing subcarriers 48. The result of subcarrier mapping 78 in each transmitter channel 76 is a collection of complex subcarrier amplitude sets which collectively form a frequency domain representation of an undistorted, modulated communication signal 80. At this point, user payload data 64 has been transformed into signals applied to assigned payload subcarriers 44. Signal 80 is undistorted because no peak-reduction noise has been introduced into the communication signal up to this point in the process.

A communication signal, such as modulated communication signal 80 and others discussed below, is an electronic signal that may undergo a variety of different processing steps and be represented in a variety of different ways throughout communication system 20, including as one or more digital streams of data or as one or more analog signals. A communication signal conveys modulated user payload data 64. The transmission of user payload data 64 is the primary purpose of communication system 20, transmitter 56, and UE 26. Any communication signal within transmitter 56 could be demodulated or otherwise processed to recover user payload data 64. While a communication signal may have received a wide variety of processing steps, such steps do not destroy, erase, modify, alter, or delete user payload data 64 conveyed in amplitude and/or phase of a communication signal.

Figure 4:
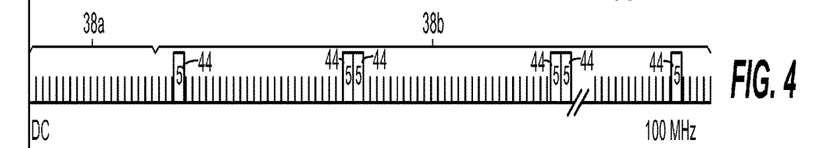
FIG. 4 shows an exemplary schematic frequency domain plot of a modulated communication signal produced in one embodiment through processing performed by a transmitter included in the PAPR-managed UE depicted in FIG. 3.

FIG. 4 shows an exemplary schematic frequency domain plot of modulated communication signal 80. In particular, FIG. 4 depicts communication signal 80 for an exemplary situation and for the single, specific PAPR-managed user equipment apparatus (UE) #5 (FIG. 1). FIG. 4 depicts the same bandwidth 40 and exemplary situation which are also shown in FIG. 2, but shows bandwidth 40 from the perspective of this specific UE #5. Referring to FIGS. 3 and 4, assigned payload subcarriers 44 have energy which has been placed into subcarriers 44 by subcarrier mapping section 78. No energy has been mapped into unassigned payload subcarriers 46, which from the perspective of this specific UE #5 includes subcarriers 42 which may be assigned to other UE's 24 and subcarriers 42 which are not assigned to any UE 24. Likewise, no energy has been mapped into noise-bearing subcarriers 48 by subcarrier mapping section 78.

Following spatial mapping, an M-point inverse discrete Fourier transform (IDFT) section 82 performs an IDFT operation for each transmitter channel 76 to transform frequency domain communication signal 80 into the time domain. The exemplary situation shown in FIG. 4 depicts a situation where all assigned payload subcarriers 44 have been assigned in only a single, substantially contiguous frequency band 38b, and the M-point IDFT will suffice. Alternately, M may be reduced by the number of subcarriers 42 included in non-contiguous frequency band 38a to which no payload subcarriers 44 have been assigned in this example. In such an alternative, bandwidth 40 and population 50 can be shifted toward DC rather than as depicted in FIG. 4.

On the other hand, in one embodiment, the number of transmitter channels 76 may increase at subcarrier mapping sections 78 to accommodate disaggregation into non-contiguous frequency bands 38a and 38b. The use of different transmitter channels 76 for different frequency bands 38 allows the different channels 76 to be accurately tuned for the different bands 38a or 38b. In this embodiment, IDFT sections 82 perform different IDFT operations for each different non-contiguous frequency band 38. These different IDFT operations are configured as $M_1$-point, $M_2$-point ... $M_L$-point IDFTs, where $M_1$, $M_2$, and $M_L$ are respective numbers of subcarriers 42 residing in L non-contiguous frequency bands for which separate transmitter channels 76 are provided, and where $M_1+M_2+ \ldots +M_L=M$.

For each transmitter channel 76, after IDFT section 82 a section 84 adds cyclic prefixes and pulse shaping to the time domain communication signals. The cyclic prefix is configured to prevent inter-block interference due to multipath propagation, and the pulse shaping is configured to reduce out-of-band emissions. The signals output from section 84 collectively form an undistorted, time domain, modulated FDMA communication signal 86. Signal 86 is undistorted because no peak-reduction noise has been introduced into signal 86 up to this point.

Figure 5:
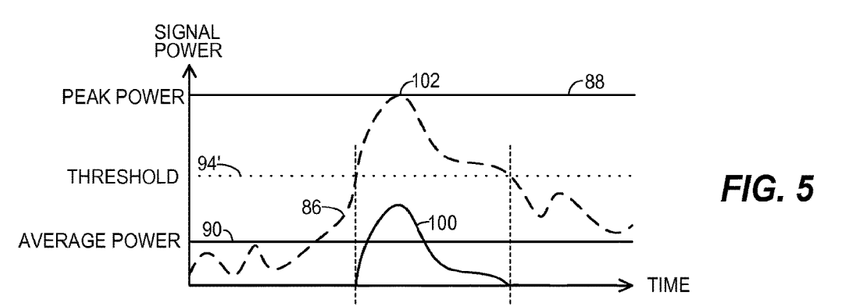
FIG. 5 shows an exemplary schematic time domain plot of the modulated communication signal produced in one embodiment through processing performed by a transmitter included in the PAPR-managed UE depicted in FIG. 3.

FIG. 5 shows an exemplary schematic time domain plot of undistorted modulated FDMA communication signal 86. Modulated FDMA communication signal 86 is characterized as having a peak power level 88 and an average power level 90. It is the ratio of power levels 88 and 90 that determines the PAPR for modulated communication signal 86. In this example, which is characteristic of FDMA communication signal waveforms, including SC-FDMA waveforms and OFDMA waveforms, PAPR is undesirably high. If modulated FDMA communication signal 86 were converted into an analog RF signal and amplified, a power amplifier would need to be biased to linearly amplify peak 88, but would produce a communication signal having only average power 90. This is an undesirable situation because it results in excessive power consumption in the power amplifier, an undesirably weak transmitted communication signal, and/or the use of an excessively costly power amplifier.

As shown in FIG. 3, a PAPR-reduction section 92 is included in transmitter 56 to receive modulated FDMA communication signal 86 and to perform processing which reduces its PAPR. Each separate transmitter channel 76 includes its own PAPR-reduction section 92. All PAPR-reduction sections 92 may be configured substantially the same, except that sampling rates and the scope of various DFT and IDFT operations included in section 92 may be uniquely configured to efficiently cover the respective widths of different frequency bands 38 in a manner that will be understood by those of skill in the art. PAPR-reduction section 92 operates in response to a magnitude threshold value 94 supplied by control section 58 as well as other control data which are discussed below. Since FIG. 5 characterizes signal 86 in terms of its power, FIG. 5 depicts the threshold value as a power threshold value 94' rather than the corresponding magnitude threshold 94. Magnitude threshold value 94 is desirably established by a control loop at a value that minimizes PAPR.

Figure 6:
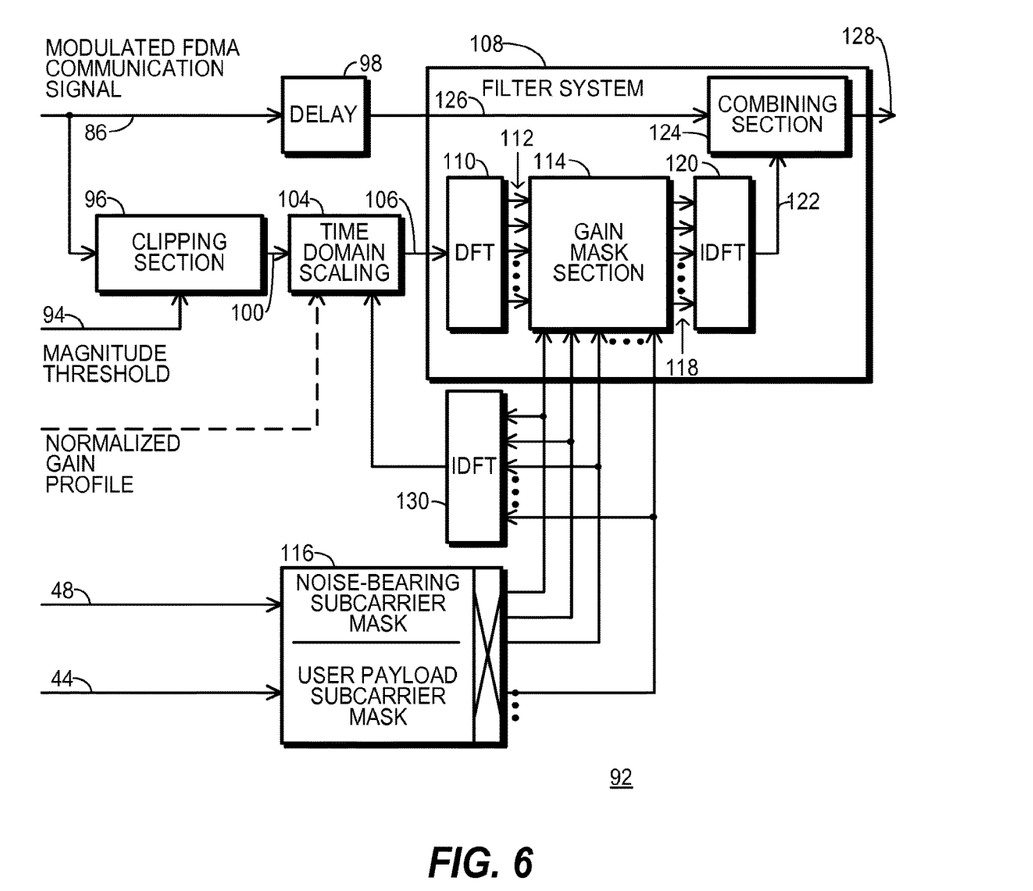
FIG. 6 shows a block diagram of one embodiment of a peak reduction section of the PAPR-managed UE transmitter depicted in FIG. 3.

FIG. 6 shows a block diagram of one embodiment of PAPR-reduction section 92. The following discussion primarily references FIG. 6, but also references FIGS. 3 and 5 in a supporting role. In section 92, modulated FDMA communication signal 86 is applied at a clipping section 96 and at a delay element 98. Magnitude threshold 94 is applied to clipping section 96 from control section 58. Clipping section 96 performs a form of limiting operation to produce a clipped signal 100. In this embodiment, clipped signal 100 corresponds to the excursion in the magnitude of modulated FDMA communication signal 86 which exceeds magnitude threshold 94 and may also be described as being an excursion signal. In forming clipped signal 100, clipping section 96 may substitute zero magnitude samples for all samples in communication signal 86 less than magnitude threshold 94, and pass all samples having a magnitude greater than or equal to threshold 94, but reduced in magnitude by the magnitude of threshold 94. Thus, clipped signal 100 formed in clipping section 96 corresponds to the excursion portion of communication signal 86 that exceeds threshold 94. Clipped signal 100 is further processed within PAPR-reduction section 92 and eventually recombined with communication signal 86. FIG. 5 depicts an arbitrary example in which a single peak event 102 occurs within a symbol period. But any number of raw peak events may be present.

Figure 7:
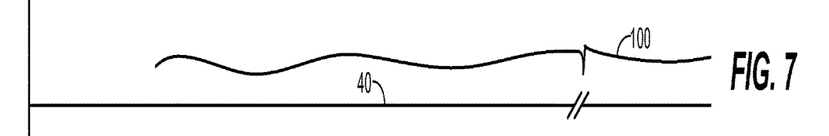
FIG. 7 shows an exemplary schematic frequency domain plot of a clipped signal produced in one embodiment through processing performed by the peak reduction section depicted in FIG. 6.

FIG. 7 shows an exemplary schematic frequency domain plot of clipped signal 100, which also corresponds to bandwidth 40 of FIGS. 2 and 4. FIG. 7 shows that clipped signal 100 exhibits peak-reduction noise energy spread throughout population 50 of subcarriers 42. Peak-reduction noise energy is spread throughout population 50 due to the bandwidth-expanding clipping operation performed in clipping section 96. Precisely the same amount of energy may not appear in all subcarriers 42 of population 50, and some subcarriers 42 may receive only insignificant amounts of energy, but the majority of subcarriers 42 receive significant amounts of energy. For the example depicted in FIG. 7, the plot does not extend to DC to maintain correspondence with FIGS. 2 and 4. As discussed above, the frequency span of communication signal 86, bandwidth 40 and population 50 may be shifted toward DC in a transmitter channel 76 that does not process all frequency bands 38.

Referring to FIGS. 5 and 6, clipped signal 100 is a time domain signal that passes from clipping section 96 to a time domain scaling section 104. Scaling section 104 generates a time domain, scaled excursion signal 106. Scaled excursion signal 106 passes to a filter system 108. Filter system 108 includes a DFT section 110 which transforms time domain, scaled excursion signal 106 into a frequency domain excursion signal 112 having separate sub-signals for separate subcarriers 42. Excursion signal 112 passes to a gain mask section 114. In gain mask section 114 a multiplication operation is performed between each subcarrier 42 and respective gain mask values supplied by a mask generator 116. These multiplication operations form a frequency domain, filtered excursion signal 118 having a sub-signal for each subcarrier 42. Filter system 108 also includes an IDFT section 120 which transforms frequency domain, filtered excursion signal 118 into a time domain, filtered excursion signal 122, and a combining section 124 which subtracts filtered excursion signal 122 from a delayed version 126 of time domain, modulated FDMA communication signal 86 and obtained from delay element 98. The subtraction operation of combining section 124 essentially cancels the excursion portion of modulated FDMA communication signal 86 exceeding magnitude threshold 94 to form a peak-reduced FDMA communication signal 128. But the cancellation operation is precisely crafted to be imperfect to the degree necessary for transmitter 56 to conform to in-band and out-of-band noise constraints. As discussed above, modulated FDMA communication signal 86 was considered to be an undistorted signal because no peak-reduction noise had been introduced into signal 86. With peak-reduced FDMA communication signal 128, peak-reduction noise has now been introduced through the operation of combining section 124. Consequently, peak-reduced FDMA communication signal 128 is a distorted communication signal. But the distortion is specifically crafted so that, after subsequent scaling to take advantage of a reduced PAPR, the benefits significantly outweigh the costs of the distortion.

For each symbol of scaled excursion signal 106, filter system 108 essentially generates in the time domain signal of filtered excursion signal 122 a sync pulse centered at the excursion's peak but having an amplitude attenuated from the amplitude of the peak in clipped signal 100. Prior to filtering in filtering system 108, scaling section 104 scales clipped signal 100 to compensate for the amplitude attenuation of filter system 108. This scaling operation causes the peak amplitude of time domain, filtered excursion signal 122 to match the amplitude of the peak in clipped signal 100. In one embodiment, an IDFT section 130 transforms the gain mask values into a time domain signal that defines this attenuation profile, and provides this attenuation profile to scaling section 104. In another embodiment, IDFT section 130 may be replaced by a more simple calculation that provides a simple scalar responsive to gain mask values, and a normalized gain profile, such as a normalized sync function, may also be provided to scaling section 104 to define the attenuation profile.

Gain mask generator 116 may be configured by control section 58 to cause excursion filter section 108 to accomplish three or four goals. For a first goal, energy is removed from all unassigned subcarriers 46 so that emissions from this PAPR-managed UE 26 will not interfere with the ULs of other UEs 24. This first goal is accomplished by using gain mask values of zero for all unassigned subcarriers 46.

For a second goal, a small, controlled amount of peak-reduction noise energy is mapped into assigned payload subcarriers 44. The small amount is limited so that peak-reduced FDMA communication signal 128 complies with in-band noise constraints. In one embodiment, noise constraints are imposed by a communication standard to which UE 26 adheres. Such noise constraints may be referred to as an error vector magnitude (EVM) constraint, or in another way. Such noise constraints establish a maximum amount of transmitter-generated noise that is to be permitted in different circumstances and vary depending upon the modulation order and code rate of the link. For example, EVM for a rate-½, QPSK link may be set at a maximum of around 17%. In another embodiment, such noise constraints may be based upon an estimate made at transmitter 56 of the total SNR likely to be experienced by a receiver in base station 22, accounting for receiver thermal noise, transmitter-generator noise, and transmitter signal level. For either embodiment, gain mask values are lowered to insure that peak-reduction noise from excursion signal 112 will remain below the noise constraint. The appropriate gain mask value may be determined by a table look up operation using modulation order and code rate as an index, or preferably, the appropriate gain mask value may be determined in a control loop implemented in control section 58 which monitors feedback from the output of transmitter 56 to measure the amount of noise being introduced into each subcarrier and makes adjustments to insure compliance with the noise constraint.

For a third goal, peak-reduction noise energy is mapped into noise-bearing subcarriers 48. Moreover, peak-reduction noise energy is mapped into noise-bearing subcarriers 48 without limitation from any noise constraint. Desirably, gains for noise-bearing subcarriers 48 are set much higher than the settings used for assigned payload subcarriers 44, and each noise-bearing subcarrier 48 in the subset 54 which applies to the subject transmitter channel 76 receives the same gain value. Typically, gains in the range of 1.0 to 2.0 are used, with a precise value being determined empirically or in a control loop implemented in control section 58 to be at that point where PAPR is minimized. The gains are set sufficiently high so that if applied to payload subcarriers 44, which have noise constraints imposed, rather than noise-bearing subcarriers 48, the noise levels would exceed such constraints.

In one embodiment (not shown), the bandwidth of scaling section 104 and filter system 108 may be expanded beyond bandwidth 40 by suitable sampling rate adjustments, causing clipped signal 100 to have peak-reduction noise energy distributed throughout a bandwidth greater than bandwidth 40. In this embodiment, for a fourth goal peak-reduction noise is removed at the boundaries of bandwidth 40 and extending outward from bandwidth 40 for a small distance using mask values of zero, but increasing amounts of out-of-band peak-reduction noise are permitted further away from the boundaries of bandwidth 40. Such out-of-band peak-reduction noise is then combined with in-band peak-reduction noise in an extra wideband signal to achieve further PAPR reductions prior to RF amplification, and then removed by filtering after RF amplification. Since the out-of-band peak-reduction noise is attenuated after RF amplification, no spectral mask violation occurs.

Figure 8:
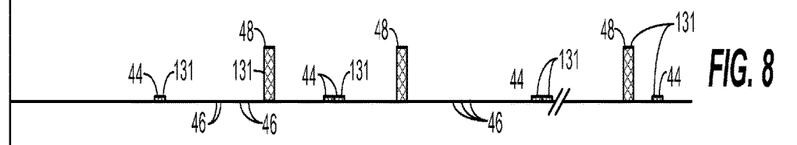
FIG. 8 shows an exemplary schematic frequency domain plot of a filtered excursion signal produced in one embodiment through processing performed by the peak reduction section depicted in FIG. 6.

FIG. 8 shows an exemplary schematic frequency domain plot of filtered excursion signal 118 where these goals have been accomplished. As shown in FIG. 8, no peak-reduction noise 131 appears in unassigned payload subcarriers 46, only a small amount of peak-reduction noise 131 which supports compliance with an in-band noise constraint appears in assigned payload subcarriers 44, and a much greater amount of peak-reduction noise 131 appears in noise-bearing subcarriers 48. And, a greater amount of peak-reduction noise 131 appears in noise-bearing subcarriers 48 for filtered excursion signal 118 than appears in noise-bearing subcarriers 48 for modulated communication signal 86 (see FIG. 4).

Figure 9:
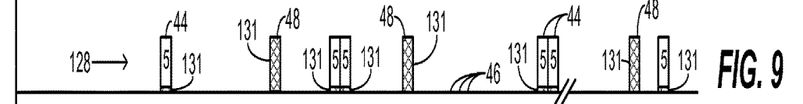
FIG. 9 shows an exemplary schematic frequency domain plot of a peak-reduced communication signal produced in one embodiment through processing performed by the peak reduction section depicted in FIG. 6.
Figure 10:
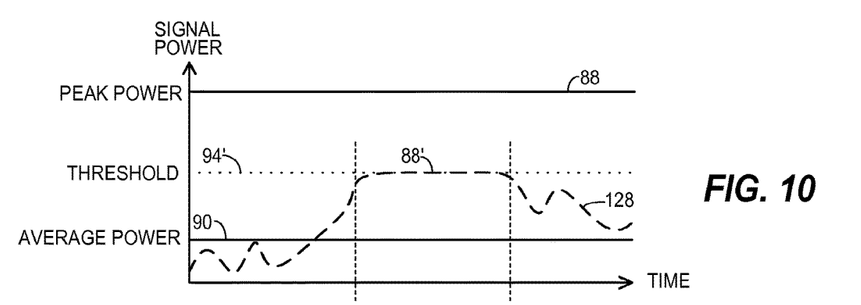
FIG. 10 shows an exemplary schematic time domain plot of the peak-reduced communication signal produced in one embodiment through processing performed by the peak reduction section depicted in FIG. 6.

FIG. 9 shows an exemplary schematic frequency domain plot of peak-reduced FDMA communication signal 128, and FIG. 10 shows an exemplary schematic time domain plot of the peak-reduced FDMA communication signal 128. FIG. 9 shows that substantially no energy, whether signal or noise, resides in unassigned payload subcarriers 46. Both peak-reduction noise 131 and communication signal energy reside in assigned payload subcarriers 44, with the signal energy being greater than the noise energy so that the resulting SNR is greater than one. And, only peak-reduction noise 131 resides in noise-bearing subcarriers 48 so that the resulting SNR is less than one. Moreover, the total amounts of energy in each assigned payload subcarrier 44 and each noise-bearing subcarrier 48 are about the same. FIG. 10, when viewed in comparison with modulated communication signal 86 shown in FIG. 5, shows that in the time domain the excursion of modulated FDMA communication signal 128 above power threshold 94' has been substantially removed by cancellation. And, the portion of modulated FDMA communication signal 128 below power threshold 94' remains substantially unchanged. A peak power level 88' of peak-reduced signal 122 substantially corresponds to threshold 94' and is much closer to average power level 90 than original peak power level 88, indicating that the PAPR has been reduced.

While FIG. 6 depicts one suitable form of peak reduction section 92, other suitable forms of peak reduction section 92 may also be used. For example, in one embodiment, clipped signal 100 (FIGS. 5-6) may represent the portion of modulated communication signal 86 less than magnitude threshold 94, causing both peak-reduction noise 131 and the communication signal to be combined in clipped signal 100. Then, filter system 108 may directly filter such a combined signal-and-noise version of clipped signal 100 to permit in-band noise energy only in assigned payload subcarriers 44 and noise-bearing subcarriers 48, followed by a scaling section that restores the amplitude of the clipped-and-filtered signal. Then the clipping, filtering, and scaling operations may be repeated several times. This and other equivalent peak reduction sections 92 may be utilized in transmitter 56.

Referring back to FIG. 3, for each transmitter channel 76, peak-reduced FDMA communication signal 128 is provided to control section 58 for monitoring and to a transmission section 132. For each peak-reduced FDMA communication signal 128, control section 58 may measure its PAPR and close a control loop on this measurement. The control loop may output magnitude threshold value 94, and the control loop may dither magnitude threshold value 94 to maintain the measured PAPR value at a minimum. As magnitude threshold value 94 decreases, additional peak-reduction noise 131 (FIGS. 8-9) will be mapped into assigned payload subcarriers 44 and noise-bearing subcarriers 48. But when operating in a steady state condition, the additional peak-reduction noise 131 should appear in noise-bearing subcarriers 48 because the in-band noise constraints for assigned payload subcarriers 44 will prevent the additional noise from appearing in subcarriers 44, while the lack of a noise-limiting constraint for noise-bearing subcarriers 48 will cause the additional noise to appear in subcarriers 48.

While FIG. 3 shows peak-reduced FDMA communication signals 128 being directly applied to transmission section 132, in some embodiments other features may further process peak-reduced FDMA communication signals 128 prior to application at transmission section 132. Such other features may include trough reduction, predistortion, bias control circuits, and the like.

Within transmission section 132, and for each transmitter channel 76, the respective peak-reduced FDMA communication signal 128 is eventually applied to an automatic gain control (AGC) and digital-to-analog (D/A) conversion section 134. Section 134 also receives control signals from control section 58. Section 134 produces a baseband, scaled peak-reduced communication signal 136 in an analog form. Analog peak-reduced communication signal 136 then passes to an upconversion section 138 where it is upconverted to its assigned RF frequency band 38 (FIG. 2), and filtered. Following upconversion, the peak-reduced communication signal, now at RF, is routed to an RF power amplifier 140. A bias control section 142 may receive control signals from control section 58 and provides biasing signals to RF power amplifier 140. The amplified peak-reduced communication signal output from RF power amplifier 140 passes through a circulator system 144 to an antenna 146 associated with the transmitter channel 76, where it is broadcast from transmitter 56 and UE 26.

Figure 11:
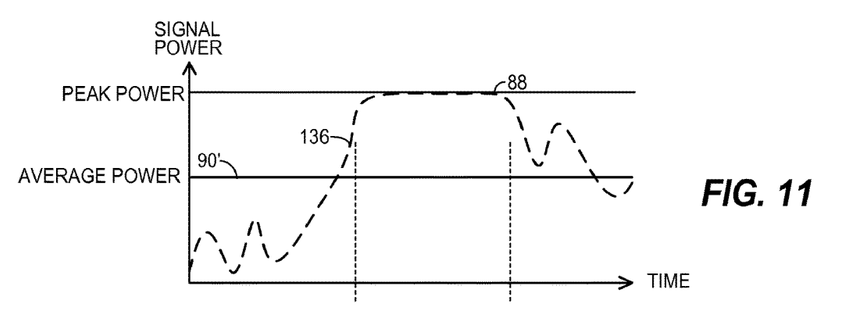
FIG. 11 shows an exemplary schematic time domain plot of a scaled peak-reduced communication signal produced in one embodiment through processing performed by the transmitter included in the PAPR-managed UE depicted in FIG. 3.

FIG. 11 shows an exemplary schematic time domain plot of scaled peak-reduced communication signal 136. Section 134 produces scaling which causes the peak power of peak-reduced communication signal 136 to be maintained at a level, such as near peak power level 88, which is the maximum peak power that can be linearly amplified in RF power amplifier 140. This scaling operation, in combination with the PAPR-reduction operation of PAPR-reduction section 92, causes the average power of the peak-reduced communication signal 136 to increase compared to the average power of modulated communication signal 86 (FIG. 5). Those skilled in the art will understand how the increase in average power, without violating noise constraints as discussed above, may be translated into one or more desirable communication system attributes of an increased data rate, increased data throughput, increased radio range, and/or reduced power consumption.

FIG. 3 also shows that feedback signals are extracted from the amplified RF peak-reduced communication signal output from RF power amplifiers 140 and supplied to control section 58. In control section 58, such feedback signals may be downconverted, compared to a delayed version of the forward communication signal, and transformed into frequency domain sub-signals to determine the amount of noise energy and signal energy actually being transmitted in each subcarrier 42. Such signal and noise feedback may then be used by control section 58 in operating control loops that establish magnitude threshold 94 and gain masks for assigned payload subcarriers 44.

Figure 12:
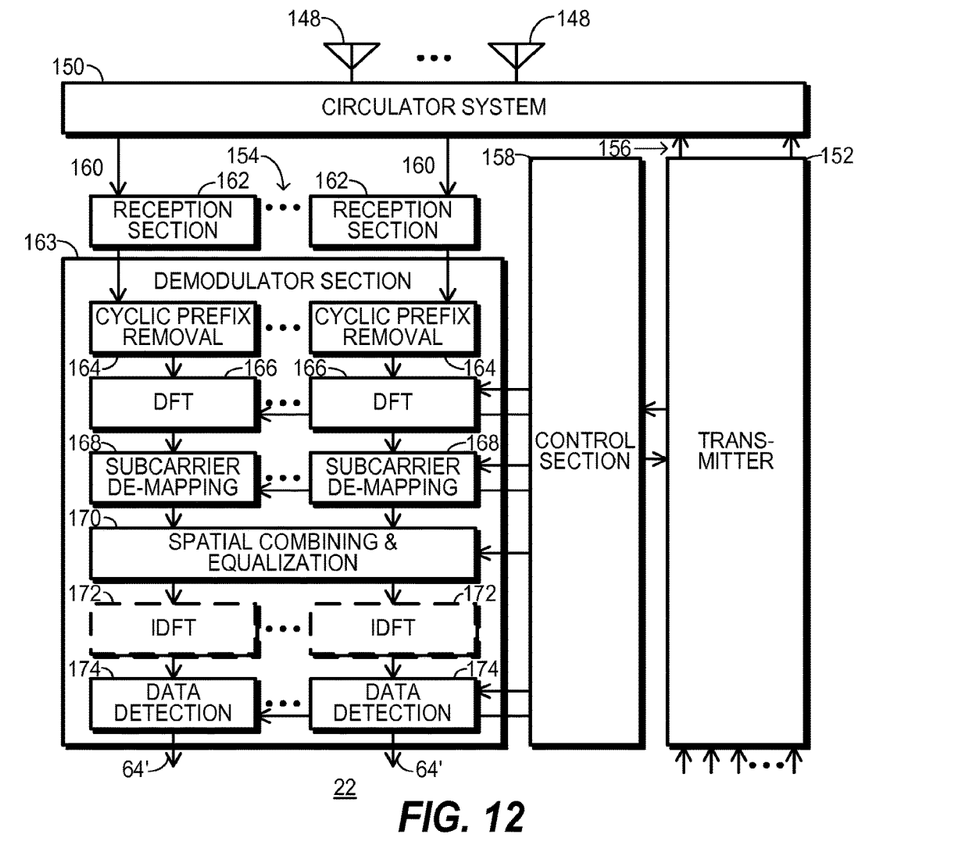
FIG. 12 shows a simplified block diagram of one embodiment of a base station which may be used in the FDMA communication system depicted in FIG. 1.

FIG. 12 shows a simplified block diagram of one embodiment of base station 22. Base station 22 may include a number of antennas 148 to support communication in a variety of MIMO modes and to support communication through non-contiguous frequency bands 38 (FIGS. 2 and 4). Antennas 148 couple to a circulator system 150, as does a transmitter 152 and a receiver 154. Transmitter 152 generates one or more RF communication signals 156 that pass through circulator system 150 and antennas 148 for down-link communication with UEs 24. Such signals 156 convey control data to PAPR-managed UEs 26, including, but not limited to, identities of assigned payload subcarriers 44, unassigned payload subcarriers 46, and noise-bearing subcarriers 48. Transmitter 152 may be implemented using a conventional transmitter of a type known to those skilled in the art and configured for operation under the communication standards with which the down link 30 (FIG. 1) portions of communication links 28 (FIG. 1) are compatible. Base station 22 also includes a control section 158 which couples to transmitter 152 and receiver 154. Control section 158 may be implemented using conventional digital signal processor (DSP), microcontroller, microprocessor, computer, processor, and/or state machine circuits, including peripheral analog and digital devices, converters, and memory, and processes controlled by software.

Figure 13:
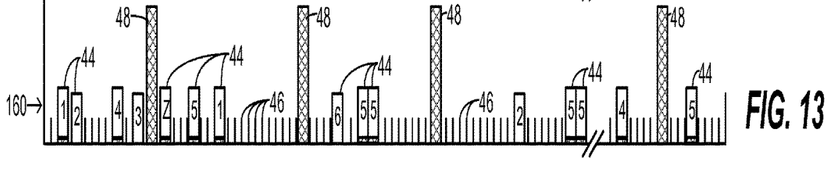
FIG. 13 shows an exemplary schematic frequency domain plot of a communication signal received in one embodiment at a receiver of the base station depicted in FIG. 12.

FIG. 13 shows an exemplary schematic frequency domain plot of a communication signal 160 received in one embodiment at receiver 154 of base station 22. In comparison with a single peak-reduced communication signal 128 (FIG. 9) transmitted from a single PAPR-managed UE 26, communication signal 160 differs in a couple of aspects. The example of FIG. 13 depicts an instant in time where a number of UEs 24 are simultaneously transmitting their respective communication signals. FIG. 13 omits any indication of thermal noise which is received at a low level throughout bandwidth 40, as well as any interference from devices other than UEs 24. Beyond any thermal noise and interference, significant amounts of signal energy and noise energy are distributed throughout bandwidth 40. This energy and noise is simultaneously transmitted from UEs 24. From PAPR-managed UEs 26, for assigned payload subcarriers 44, noise levels are likely at maximum levels permitted for successful communication. This may not be the case for other UEs 24. And noise-bearing subcarriers 48 likely contain more energy than is presented in any assigned payload subcarrier 44. This large amount of energy is due to the additive effect of multiple PAPR-managed UEs 26 simultaneously transmitting energy over the same noise-bearing subcarriers 48.

Referring back to FIG. 12, receiver 154 may receive communication signal 160 in various forms at a number of reception sections 162 corresponding to the MIMO modes and non-contiguous frequency bands 38. Reception sections 162 each apply amplification, downconversion, digital conversion and other processing functions on their respective received communication signal 160. Following reception sections 162, the downconverted, digital signals pass to cyclic prefix removal sections 164 of a demodulating section 163. Sections 164 remove the cyclic prefix and perform temporal synchronization.

Then, the received signals are transformed to the frequency domain at DFT sections 166. DFT sections 166 may be configured to limit or zero any energy appearing in noise-bearing subcarriers 48, as identified by control section 58. No data is intended to be recovered from such subcarriers 48, and such efforts help repress the influence of noise energy on the data conveyed in other subcarriers. Once in the frequency domain, subcarrier de-mapping sections 168 sort subcarriers received from different UEs 24 into different batches of subcarriers. Noise-bearing subcarriers 48 may again be ignored in this de-mapping section and not associated with energy from other subcarriers to further repress the influence of noise energy on the data conveyed in other subcarriers. After de-mapping, a spatial combining and equalization section 170 both equalizes the received signals to compensate for inter-symbol interference and performs MIMO processing to merge multiple signal paths into individual paths. After section 170, IDFT sections 172 transform the equalized symbols back into the time domain when the received signals are SC-FDMA waveforms. But if the received signals are OFDMA waveforms, sections 172 may be omitted. Again, energy from noise-bearing subcarriers 48 may be omitted from the time domain transformation.

Following sections 172, detection and decoding functions are provided in data detection sections 174. Detection and decoding take place in the time domain in a substantially conventional manner, and user payload data 64' is provided to a subsequent service deemed to be a consumer of the user payload data 64'. In accordance with communication system 20 goals, user payload data 64' should very nearly, and preferably exactly, match user payload data 64 (FIG. 3) provided to transmitters 56 in UEs 24.

Communication system 20 may implement a frequency hopping scheme in ULs 32. In one embodiment, communication system 20 defines frequency hopping sequences to avoid hopping assigned payload subcarriers 44 onto noise-bearing subcarriers 48. But another embodiment does not define frequency hopping sequences to avoid hopping assigned payload subcarriers 44 onto noise-bearing subcarriers 48.

When a small number of noise-bearing subcarriers 48 are defined for a population of subcarriers 42, a frequency hopping sequence may occasionally hop an assigned payload subcarrier 44 onto a noise-bearing subcarrier 48 regardless of any effort to avoid such collisions. In such cases, a noise-bearing subcarrier 48 and an assigned payload subcarrier 44 may be the same subcarrier from time to time. When this happens the noise-bearing role will trump the payload subcarrier role. While this collision condition persists, the shared-role subcarrier will not convey data. But this collision condition should persist for only a small percentage of the time. When averaged over time, the SNR of assigned payload subcarriers 44 will remain above one and the SNR of noise-bearing payload subcarriers will remain below one regardless of such collisions.

Coding gain achieved by conventional forms of error correction encoding will be able to correct the lack of data being conveyed in the occasional subcarrier for brief periods of time. But to further repress the influence of noise energy on the data conveyed in other subcarriers, erasures may be substituted for any energy detected in noise-bearing subcarriers 48. Those skilled in the art will appreciate that erasures represent branch metric codes used in data detection sections 174 that indicate a low confidence is to be associated with the data so that a subsequent error detection and correction process will pay scant attention to such data.

In summary, at least one embodiment of the present invention provides an improved technique and apparatus for managing PAPR in its transmitted signals. In at least one embodiment, common-use noise-bearing subcarriers are assigned so that multiple UEs may simultaneously transmit peak-reduction noise. In at least one embodiment, a transmitter in a UE introduces peak-reduction noise into an otherwise undistorted modulated communication signal to reduce the signal's PAPR, and the peak-reduction noise is, to a large extent, mapped into one or more noise-bearing subcarriers that are not intended to convey user payload data. In at least one embodiment, multiple UEs communicating with a common base station transmit peak-reduction noise simultaneously over the same noise-bearing subcarriers. And, in at least one embodiment, in an FDMA communication system a PAPR-managed UE simultaneously transmits energy in some subcarriers at an SNR of greater than one and transmits energy in other subcarriers at an SNR of less than one.

Although the preferred embodiments of the invention have been illustrated and described in detail, it will be readily apparent to those skilled in the art that various modifications and adaptations may be made without departing from the spirit of the invention or from the scope of the appended claims. For example, those skilled in the art will appreciate that the specific functions depicted herein through the use of block diagrams may be partitioned in equivalent but different ways than shown and discussed herein, and the processes, subprocesses, and tasks specifically described herein may be organized in equivalent but vastly different ways. Such equivalent but different ways and the modifications and adaptations which may be implemented to achieve them are to be included within the scope of the present invention.

What is claimed is:

1. A method comprising excursion compensating a first communication signal at a first carrier frequency in a first mobile device, wherein the excursion compensating the first communication signal comprises:
    extracting in time domain an excursion portion of the first communication signal that is above a signal magnitude threshold parameter of a first amplifier comprised in the first mobile device;
    selectively generating noise at a non-carrier frequency different than the first carrier frequency based on the extracted excursion portion of the first communication signal; and
    combining the selectively generated noise based on the first communication signal with the first communication signal in synchronization to generate a first excursion compensated signal that substantially satisfies both signal magnitude threshold performance requirements of the first power amplifier and satisfies performance requirements parameters of the first mobile device.

2. The method of claim 1, comprising excursion compensating a second communication signal at a second carrier frequency in a second mobile device, wherein the excursion compensating the second communication signal comprises:
    extracting in time domain an excursion portion of the second communication signal that is above a signal magnitude threshold parameter of a second amplifier comprised in the second mobile device;
    selectively generating noise at the non-carrier frequency different than the second carrier frequency based on the extracted excursion portion of the second communication signal; and
    combining the selectively generated noise based on the first communication signal with the second communication signal in synchronization to generate a second excursion compensated signal that substantially satisfies both signal magnitude threshold performance requirements of the second power amplifier and satisfies performance requirements parameters of the second mobile device.

3. The method of claim 2, wherein the first mobile device and the second mobile device communicate with a base station of a wireless network.

4. The method of claim 3, wherein the wireless network designates the non-carrier frequency.

5. The method of claim 4, wherein the wireless network designates the non-carrier frequency dynamically.

6. The method of claim 4, wherein the wireless network designates the non-carrier frequency statically.

7. The method of claim 1, wherein the performance requirements parameters are error vector magnitude specifications based on subchannel noise power levels of the first communication signal.

8. The method of claim 7, wherein the error vector magnitude specifications specify a maximum short-term average ratio of total noise to signal power in the first communication signal as measured at an output of a corresponding demodulator at a receiver.

9. The method of claim 1, wherein the excursion compensating comprises:
  extracting a portion of the first communication signal whose magnitude exceeds a corresponding input signal magnitude threshold based on the signal magnitude threshold performance requirements of the first amplifier to generate an excursion portion; and
  scaling in frequency domain the excursion portion to generate the selectively generated noise based on the performance requirements parameters of the first mobile device.

10. The method of claim 9, wherein excursion compensating comprises scaling in time domain the excursion portion to compensate for signal power that will be lost in the scaling in frequency domain.

11. The method of claim 9, wherein the excursion compensating compensates the first communication signal by filtering in time domain the excursion portion using a bandpass filter corresponding to a spectrum of the first communication signal.

12. The method of claim 11, wherein the excursion compensating compensates the communication signal by scaling in the time domain the excursion portion based on static characteristics of the bandpass filter.

13. The method of claim 11, wherein the filtering the excursion portion is performed prior to the scaling in frequency domain the excursion portion.

14. The method of claim 9, wherein the excursion compensating compensates the first communication signal by:
  interpolating the first communication signal prior to the generating the excursion portion; and
  decimating the first communication signal after the generating the excursion portion.

15. The method of claim 14, wherein the excursion compensating compensates the first communication signal by scaling in time domain after the interpolating and prior to the scaling in frequency domain, wherein the scaling in time domain scales the excursion portion to compensate for signal power that will be lost in the scaling in frequency domain.

* * * * *